(12) United States Patent
Zeng et al.

(10) Patent No.: US 10,091,340 B2
(45) Date of Patent: Oct. 2, 2018

(54) MOBILE TERMINAL (71) Applicant: Smartisan Digital Co., Ltd., Beijing (CN)

(72) Inventors: Lingjun Zeng, Beijing (CN); Jin Hu, Beijing (CN)

(73) Assignee: Smartisan Digital Co., Ltd., Beijing (CN)

(*) Notice: Subject to any disclaimer, the term of this patent is extended or adjusted under 35 U.S.C. 154(b) by 0 days.

(21) Appl. No.: 15/318,466

(22) PCT Filed: Jun. 2, 2015

(86) PCT No.: PCT/CN2015/080576
§ 371 (c)(1),
(2) Date: Dec. 13, 2016

(87) PCT Pub. No.: WO2015/192715
PCT Pub. Date: Dec. 23, 2015

(65) Prior Publication Data
US 2017/0134547 A1    May 11, 2017

(30) Foreign Application Priority Data

Jun. 18, 2014  (CN) .................. 2014 2 0326165 U (51) Int. Cl.
*H04M 1/02* (2006.01)
*H04B 1/3827* (2015.01)

(52) U.S. Cl.
CPC ........ *H04M 1/0266* (2013.01); *H04B 1/3833* (2013.01); *H04M 1/0283* (2013.01)

(58) Field of Classification Search
None
See application file for complete search history.

(56) References Cited

U.S. PATENT DOCUMENTS 5,884,156 A * 3/1999 Gordon ................ H04B 1/3833
                                                                   455/321
6,545,612 B1* 4/2003 Lindgren ............. H04M 1/0202
                                                                   340/686.6
(Continued)

FOREIGN PATENT DOCUMENTS

CN    101471975 A    7/2009
CN    102572036 A    7/2012
(Continued)

OTHER PUBLICATIONS

State Intellectual Property Office as the International Searching Authority, International Search Report for PCT Application No. PCT/CN2015/080576, dated Aug. 10, 2015.

*Primary Examiner* — Gennadiy Tsvey
(74) *Attorney, Agent, or Firm* — Honigman Miller Schwartz and Cohn LLP; Matthew H. Szalach; Jonathan P. O'Brien (57) ABSTRACT

Provided is a mobile terminal. The present application provides a sensor inside either or both of a receiver opening and a microphone opening, rather than providing an additional opening on the front panel of a device for installing the sensors, such that light is transmitted to the sensor via the receiver opening and/or the microphone opening, and the sensor transmits a signal via the receiver opening and/or the microphone opening; the receiver opening and/or the microphone opening are openings currently available on the front panel of the device, without the need of proving additional openings on the front panel of the device, reducing the number of the openings on the front panel of the device to make a mobile device more integrated, and provide a better user experience due to an uncluttered surface of the front panel of the device.

16 Claims, 4 Drawing Sheets

(56) References Cited

U.S. PATENT DOCUMENTS

| | | | | |
|---|---|---|---|---|
| 6,819,946 B2* | 11/2004 | Hansson | | H04M 1/03 379/433.02 |
| 6,853,850 B2* | 2/2005 | Shim | | H04M 1/605 379/432 |
| 7,206,613 B2* | 4/2007 | Kim | | H04M 19/04 455/156.1 |
| 8,144,897 B2* | 3/2012 | Ranta | | H04R 3/04 379/388.01 |
| 8,693,877 B2* | 4/2014 | Tam | | H03K 17/9631 398/118 |
| 8,698,727 B2* | 4/2014 | Herz | | G09G 3/3406 345/102 |
| 8,912,480 B2* | 12/2014 | Pope | | G01J 1/0422 250/221 |
| 9,140,794 B2* | 9/2015 | Alameh | | G01J 1/0407 |
| 9,146,304 B2* | 9/2015 | Land | | H04M 1/72522 |
| 9,392,706 B2* | 7/2016 | Yoo | | H05K 5/0017 |
| 2002/0099891 A1* | 7/2002 | Cole | | G06F 1/1616 710/200 |
| 2006/0166702 A1* | 7/2006 | Dietz | | H04M 1/22 455/566 |
| 2007/0293188 A1* | 12/2007 | Houghton | | H04L 12/66 455/404.2 |
| 2008/0113618 A1* | 5/2008 | De Leon | | H04W 12/04 455/41.2 |
| 2009/0305742 A1* | 12/2009 | Caballero | | H04B 1/3838 455/566 |
| 2012/0211656 A1* | 8/2012 | Katz | | G01S 17/026 250/338.1 |
| 2013/0157726 A1* | 6/2013 | Miyazaki | | G06F 1/3231 455/566 |
| 2015/0182146 A1* | 7/2015 | Hidaka | | G01N 33/497 455/418 |

FOREIGN PATENT DOCUMENTS

| | | |
|---|---|---|
| CN | 202856839 U | 4/2013 |
| CN | 103327138 A | 9/2013 |
| CN | 204119279 U | 1/2015 |

\* cited by examiner

MOBILE TERMINAL

The present application is the national phase of International Application No. PCT/CN2015/080576, titled "MOBILE TERMINAL" filed on Jun. 2, 2015, which claims priority to Chinese Patent Application No. 201420326165.3, entitled "MOBILE TERMINAL" filed on Jun. 18, 2014 with the State Intellectual Property Office of the People's Republic of China, both of which are incorporated herein by reference in their entirety.

FIELD

The present application relates to the technical field of mechanical structure, and particularly to a mobile terminal.

BACKGROUND

With development of mobile terminal technology, the mobile terminal has entered a touch screen time. Now, multiple sensors are installed on the mobile terminal. A signal is collected by a sensor and is further processed, so as to implement various functions and thus provide various experiences to a user.

Hereinafter some kinds of sensors are illustrated. A light sensor automatically controls a brightness of a screen by sensing a light intensity. A distance sensor emits a light pulse outwardly and calculates a distance from the distance sensor to an object according to a time duration from the light pulse being emitted to being reflected by the object.

There are also other sensors in the mobile terminal, which are similar to the light sensor and the distance sensor. These sensors need to rely on a light emitted from outside or needs to emit a signal such as infrared or a light pulse to outside. So these sensors should not be completely sealed in the mobile terminal, a window that the sensor interacts with the outside should not be shaded. Since in a conventional technology, generally, a transparent or translucent opening is provided on a touch screen of the mobile terminal and the sensor is arranged under the opening, so the sensor may not only receive a light from outside but also emit a signal to outside.

The mobile terminal generally has an earphone opening, a camera opening and so on. If a hole is provided on the screen of the mobile terminal, integration degree of the mobile device will be lowered and a front panel of the device is entirely disordered, which causes a bad user experience. So, there needs a new method for arranging an opening sensor of the mobile terminal.

SUMMARY

In view of this, the disclosure provides a mobile terminal. A sensor is arranged in an earphone opening and/or a microphone opening. There is no need to provide another hole on a front panel of the device, which makes an integration degree of the mobile device high and a user experience good.

In order to achieve the above object, the disclosure provides the following technical means.

A mobile terminal is provided, which includes a sensor, and an earphone opening arranged on a front panel of the mobile terminal device. The sensor is arranged in a housing of the mobile terminal at a position corresponding to the earphone opening. The sensor includes a sensor for sensing a light, a location or a distance.

Optionally, the sensor includes any combination of a distance sensor, a light sensor and a photoelectric sensor.

Optionally, the mobile terminal further includes a receiver. The receiver is stacked with the sensor. The sensor is arranged between the receiver and the earphone opening.

Optionally, the mobile terminal further includes a supporting plate arranged between the sensor and the receiver. The supporting plate extends beyond the sensor, and a first through hole is arranged in an extending portion of the supporting plate.

Optionally, the mobile terminal further includes an earphone sound conducting component perpendicularly connected to the supporting plate and conforming to the sensor on one side of the first through hole.

Optionally, the sensor and the receiver are arranged in parallel in a horizontal direction.

Optionally, the mobile terminal further includes a foam connected to the receiver and arranged between the receiver and the earphone opening.

Optionally, the mobile terminal further includes a sensor protective housing over the sensor. A bulge is arranged on the sensor protective housing at a position corresponding to the sensor. A groove is arranged on the sensor protective housing on the side of the bulge, and a second through hole is arranged in the groove.

Optionally, the mobile terminal further includes a dustproof net arranged over the sensor protective housing and fitting with the groove.

Optionally, the mobile terminal further includes an earphone decorative component connected to the sensor protective housing. A third through hole fitting with the bulge of the sensor protective housing is arranged in the earphone decorative component. A fourth through hole or a set of honeycomb holes for facilitating transmission of a sound is arranged in the earphone decorative component at a position corresponding to the groove.

Optionally, the mobile terminal further includes a sensor protective housing over the sensor. A fourth through hole or a set of honeycomb holes for facilitating transmission of a sound is arranged in the sensor protective housing at a position corresponding to the earphone sound conducting component.

Optionally, the mobile terminal further includes a sensor protective housing over the sensor. A fourth through hole or a set of honeycomb holes for facilitating transmission of a sound is arranged in the sensor protective housing at a position corresponding to the receiver.

Optionally, the mobile terminal further includes a dustproof net arranged between the sensor protective housing and the sensor at a position corresponding to the fourth through hole or the set of honeycomb holes.

Optionally, the earphone decorative component includes a metal material or a plastic material.

Optionally, the earphone decorative component is connected to the sensor protective housing by means of a double faced adhesive tape or a glue.

Optionally, when the decorative component of the earphone is a metal material, the earphone decorative component is connected to the sensor protective housing by means of injection molding.

Optionally, the sensor protective housing is formed of an acrylic, a polycarbonate, a propylene-butadiene-phenyldiene polymer or glass.

A mobile terminal is provided, which includes a sensor, and a microphone opening arranged on a front panel of the mobile terminal device. The sensor is arranged in a housing of the mobile terminal at a position corresponding to the microphone opening. The sensor includes a sensor for sensing a light, a location or a distance.

Optionally, the mobile terminal further includes a microphone. The microphone and the sensor are arranged side by side.

A mobile terminal is provided, which includes a sensor, and a microphone opening and an earphone opening which are arranged on a front panel of the mobile terminal device. The sensor is arranged in a housing of the mobile terminal at a position corresponding to the microphone opening and a position corresponding to the earphone opening. The sensor includes a sensor for sensing a light, a location or a distance.

In view of the above technical means, in the disclosure, instead of providing another hole on the front panel of the device for installing the sensor, the sensor is arranged in the earphone opening, in the microphone opening, or in the earphone opening and the microphone opening. As the earphone opening and the microphone opening both have an opening through outside, so a light may be transmitted to the sensor via the earphone opening and/or the microphone opening. The sensor may also transmit a signal via the earphone opening and/or the microphone opening. As the earphone opening and/or the microphone opening is an opening which is already arranged on the front panel of the device, so there is no need to open an opening on the front panel of the device. Thus, the number of the openings on the front panel of the device is reduced and an integration degree of the mobile terminal is higher. Since the number of the openings is small, a surface of the front panel of the device is not messy and a user experience is good.

BRIEF DESCRIPTION OF THE DRAWINGS

In order to describe technical solutions in embodiments of the present application or the conventional technology more clearly, hereinafter drawings to be used in the description of the embodiments or the conventional technology are introduced simply. Apparently, the drawings described below only describe some embodiments of the present application. Those skilled in the art may obtain other drawings based on these drawings without any creative work.

DETAILED DESCRIPTION OF EMBODIMENTS

Hereinafter the technical solutions of the embodiments of the disclosure are described clearly and completely in conjunction with drawings. Apparently, the described embodiments are only part of the embodiments of the disclosure, not all the embodiments. Based on the embodiments, all other embodiments obtained by those skilled in the art without any creative work belong to a protective scope of the disclosure.

In the disclosure, a sensor may be arranged in an earphone opening, in a microphone opening, or in the earphone opening and the microphone opening. Hereinafter the sensor in the earphone opening is taken as an example to be specifically described.

Figure 1:
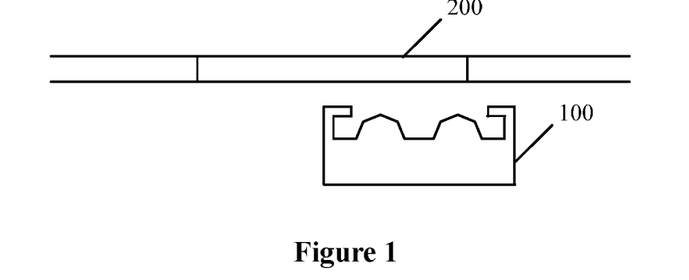
FIG. 1 is a schematic structural diagram of a mobile terminal disclosed in an embodiment of the disclosure.

As shown in FIG. 1, a mobile terminal is according to the disclosure, which includes a sensor 100, and an earphone opening 200 arranged on a front panel of the mobile terminal device. The sensor 100 is arranged in a housing of the mobile terminal at a position corresponding to the earphone opening 200. The sensor includes a sensor for sensing a light, a location or a distance.

The mobile terminal related to the embodiment includes an electronic device with an earphone opening such as a mobile phone or an ipad. The sensor includes a sensor for sensing a light, a location or a distance, such as a distance sensor, a light sensor, a photoelectric sensor or any combination of the three sensors.

The mobile terminal includes a mobile terminal housing and a separate component in the mobile terminal housing. The mobile terminal housing includes a front panel. The separate component in the mobile terminal housing includes the sensor 100. A user controls the mobile terminal to execute a corresponding operation by operating the front panel. The sensor 100 is a sensor relying on a translucent or transparent hole, which may let a light in, in the mobile terminal housing to work to receive a light from outside or emit an emitting signal such as infrared or a light pulse to outside.

Since the earphone opening 200 and a front camera opening are already provided at the front panel of the device, the number of the openings is large if a hole is further provided on the front panel of the device, which makes the integration degree of the mobile device low. Besides, a large number of opening makes the front panel of the device entirely disordered and a user experience bad. Multiple processes need to be performed on the front panel of the device to make a large number of openings. The disclosure puts forward that, the sensor 100 is arranged in a housing of the mobile terminal at a position corresponding to the earphone opening 200, in order to improve the integration degree of the mobile device, reduce the processing steps of the front panel of the device and make the front panel of the device have a good appearance.

In view of the above technical means, in the disclosure, instead of providing another hole on the front panel of the device for installing the sensor, the sensor is arranged in the earphone opening, in the microphone opening, or in the earphone opening and the microphone opening. So a light may be transmitted to the sensor via the earphone opening and/or the microphone opening. The sensor may also transmit a signal via the earphone opening and/or the microphone opening. As the earphone opening and/or the microphone opening is an opening which is already arranged on the front panel of the device, so there is no need to open an opening on the front panel of the device. Thus, the number of the openings on the front panel of the device is reduced, and an integration degree of the mobile terminal is high. Since the number of the openings is small, a surface of the front panel of the device is not disordered and a user experience is good.

In the conventional technology, a receiver 300 is arranged in the mobile terminal at a position corresponding to the earphone opening 200. Its function is to generate a sound. The sound is transmitted to a user via the earphone opening 200. A position relation between the receiver 300 and the sensor 100 is as follows.

Figure 2:
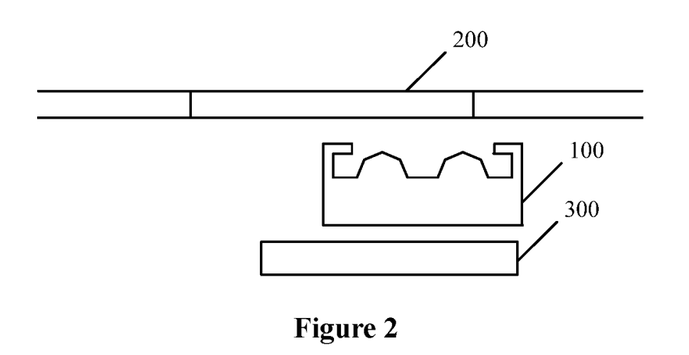
FIG. 2 is a schematic structural diagram of a mobile terminal disclosed in an embodiment of the disclosure.

In FIG. 2, a first position relation between the receiver 300 and the sensor 100 is shown. The receiver 300 is stacked with the sensor 100, and the sensor 100 is arranged between the receiver 300 and the earphone opening 200.

The sensor 100 occupies a part of a space on the receiver 300, and the sensor 100 is arranged above the receiver 300 but cannot constrict the receiver. In order to ensure a quality of a transmitting sound of the receiver and a fixed support of the sensor 100, the mobile terminal according to the disclosure further includes a supporting plate 400 and an earphone sound conducting component 500.

Figure 3:
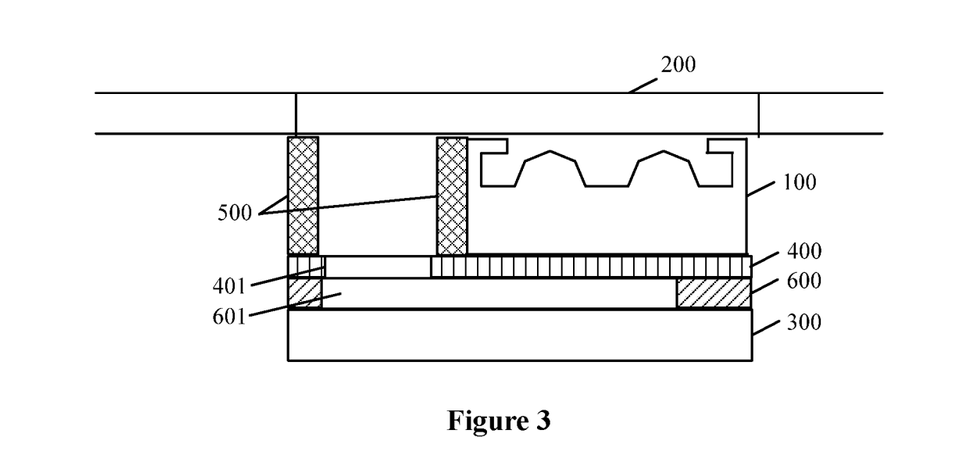
FIG. 3 is a schematic structural diagram of a mobile terminal disclosed in another embodiment of the disclosure.

As shown in FIG. 3, in order to support and fix the sensor, the mobile device further includes a supporting plate 400. The supporting plate 400 is arranged between the sensor 100 and the receiver 300, and extends beyond the sensor 100. A first through hole 401 is arranged in an extending portion of the supporting plate. Since the supporting plate 400 completely covers the receiver 300, the first through hole 401 is arranged in the supporting plate 400 at a position which does not contact the sensor 100, to ensure the quality of the transmitting sound. The sound is conducted out via the first through hole 401. In order to further ensure that the sound can be conducted out from the first through hole 401, the disclosure further provides the earphone sound conducting component 500. The earphone sound conducting component 500 is perpendicularly connected to the supporting plate 400, and conforms to the sensor 100 on one side of the first through hole 401, so that the sound passes through the first through hole and then is transmitted to the earphone opening 200 along the earphone sound conducting component 500.

Besides, as shown in FIG. 3, the mobile terminal according to the disclosure further includes a foam 600. The foam 600 is connected to the receiver 300, and is arranged between the receiver 300 and the earphone opening 200. A foam through hole 601 is arranged in the foam 600. The foam 600 mainly functions to seal, so that the sound passes through the foam through hole 601 and does not diffuse towards other directions.

In the first position relation, there is no need to provide another opening on the front panel of the device and the sensor 100 is arranged above the receiver 300, thereby saving a space in the mobile terminal and facilitating installing of other components.

Figure 4:
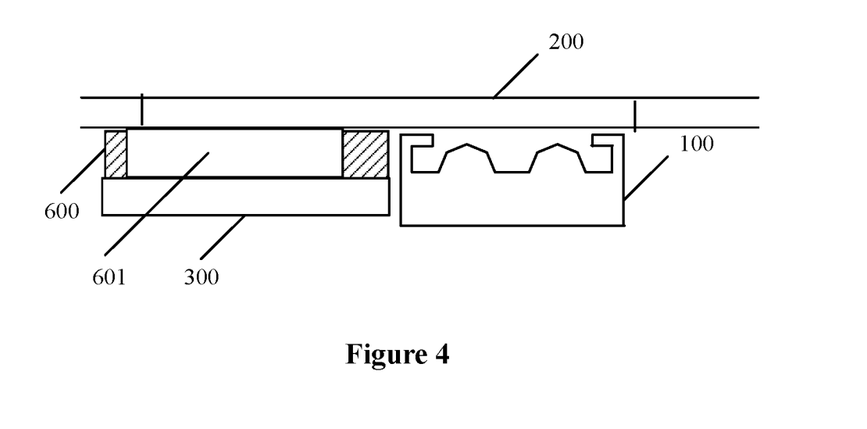
FIG. 4 is a schematic structural diagram of a mobile terminal disclosed in another embodiment of the disclosure.

As shown in FIG. 4, hereinafter a second position relation between the receiver 300 and the sensor 100 is described. The receiver 300 and the sensor 100 are arranged in parallel in a horizontal direction. That is, the sensor 100 is arranged on a plane formed by taking the receiver 300 as an axis. In FIG. 4, a schematic diagram is shown where the sensor 100 is arranged on a right side of the receiver 300.

Generally, the sensor 100 and the receiver 300 used are all a smallest component in the conventional technology. In a case that the earphone opening 200 is small, the conventional receiver 300 occupies a space in the earphone opening 200. So, being in the second position relation, the size of the original earphone opening 200 needs to be increased to accommodate the receiver and the sensor 100. A size of an area of the original earphone opening is designed based on a requirement of an area of a transmitting sound. With the development of the time, the receiver 300 may probably become smaller. When the receiver 300 becomes smaller, the receiver 300 and the sensor 100 may be arranged in a general earphone opening 200. A size of the earphone 200 needs not to be expanded.

Besides, as shown in FIG. 4, the mobile terminal according to the disclosure further includes a foam 600. The foam 600 is connected to the receiver 300, and is arranged between the receiver 300 and the earphone opening 200. A foam through hole 601 is arranged in the foam. The foam directly contacts a housing of the sensor. The foam 600 mainly functions to seal, so that the sound passes through the foam through hole 601 and does not diffuse towards other directions.

In the second position relation, the supporting plate 400 and the earphone sound conducting component 500 are not needed, and only the foam 600 is provided. The second position relation is simple in structure as compared with the first position relation. The miniaturized receiver and the sensor may be arranged side by side. There is no need to arrange the sensor above the receiver by the supporting plate. The side by side arrangement is good for reducing a space optimization of an arrangement of the components.

In order to protect the sensor 100, hereinafter a sensor protective housing 700 arranged over the sensor 100 is described. Materials with a high light transmittance are all suitable for a material of the sensor protective housing. Optionally, an acrylic, a polycarbonate, a propylene-butadiene-phenyl diene polymer or glass may be adopted. There are two implementing method of the sensor protective housing 700 in the disclosure. Firstly, a first implementing method is illustrated. In the first implementing method, sensor protection manners in the two position relations between the receiver and the sensor are similar, and thus the first position relation between the receiver and the sensor is taken as an example to be illustrated.

Figure 5:
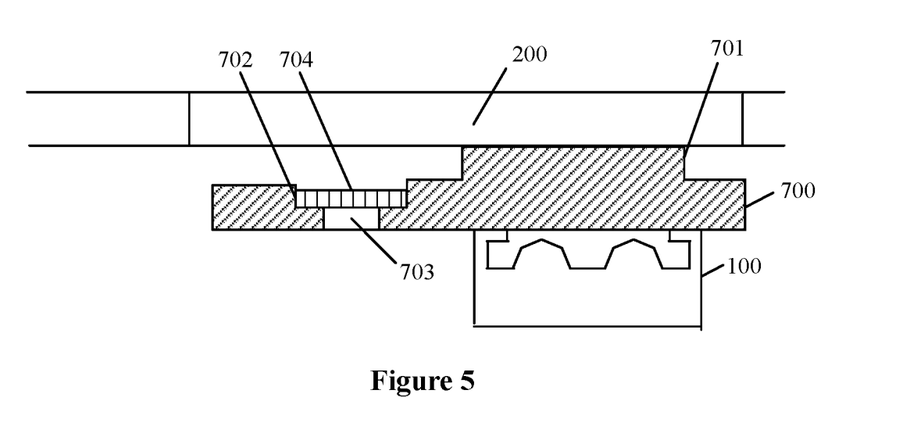
FIG. 5 is a schematic structural diagram of a mobile terminal disclosed in another embodiment of the disclosure.

In FIG. 5, a positive view of the sensor protection is shown. A bulge 701 is arranged on the sensor protective housing 700 at a position corresponding to the sensor 100. A groove 702 is arranged on the sensor protective housing 700 on the side of the bulge 701. A second through hole 703 is arranged in the groove 702.

As shown in FIG. 5, the groove 702 on the sensor protective housing 700 is used for installing a dustproof 704 which is arranged over the groove 702 of the sensor protective housing. The second through hole 703 corresponds to the first through hole 401 on the supporting plate. The sound from the receiver 300 may be transmitted through the first through hole 401 and the second through hole 703. A dust is prevented from entering in the mobile terminal via the earphone opening 200, the second through hole 703 and the first through hole 401 to reduce a life of the mobile terminal.

Figure 6:
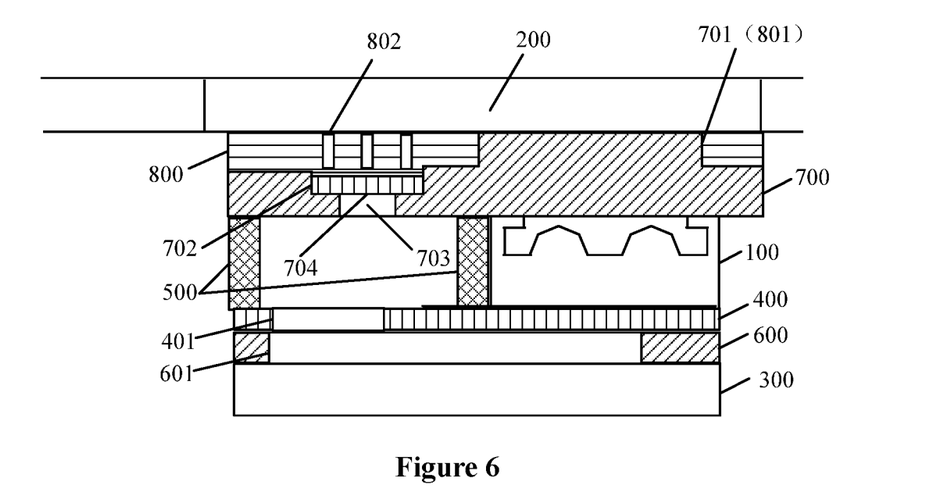
FIG. 6 is a schematic structural diagram of a mobile terminal disclosed in another embodiment of the disclosure.

As shown in FIG. 6, in order to make the mobile terminal have a good appearance, an earphone decorative component 800 is installed outside the dustproof net 704. That is, the earphone decorative component 800 is connected to the sensor protective housing 700 and is arranged between the sensor protective housing 700 and the earphone opening 200. A third through hole 801 is arranged in the earphone decorative component 800 at a position corresponding to a bulge of the sensor protective housing 700. A fourth hole 802 or a set of honeycomb holes for facilitating transmission of a sound is arranged in the earphone decorative component 800 at a position corresponding to the groove.

The earphone decorative component 800 is provided on the sensor protective housing, and the earphone decorative component 800 is generally light-tight to have a good appearance. But for the sensor under the earphone decorative component and the sensor protective housing, the material of the earphone decorative component 800 should be transparent. Thus, the bugle 701 is arranged on the sensor protective housing, the third through hole 801 is arranged in the earphone decorative component, and the bulge 701 and the third through hole 801 may be mutually locked, so that the sensor protective housing 700 may contact the earphone opening 200 via the earphone decorative component 800.

It is to be understood that the fourth through hole or the set of honeycomb holes is arranged in the earphone decorative component 800 in order to conduct the sound. The earphone decorative component 800 is connected to the sensor protective housing 700 by means of a double faced adhesive tape or a glue. Adopting the glue not only can stick firmly but also has a low cost, and a craft work is simple. While sticking the earphone decorative component to the sensor protective housing, the glue may also stick the dustproof net 704 to the sensor protective housing 700.

The material of the earphone decorative component 800 may be a plastic material or a metal material. If the earphone decorative component is made of the metal material, a plastic cement is generated by adopting an injection molding process to connect the earphone decorative component to the sensor protective housing.

Hereinafter the second implementing method of the sensor protective housing 700 is described. The second implementing method of the protective housing is different depending on difference position relation between the receiver and the sensor. Hereinafter the second implementing method of the protective housing 700 is described respectively for the two position relations between the receiver and the sensor.

Figure 7:
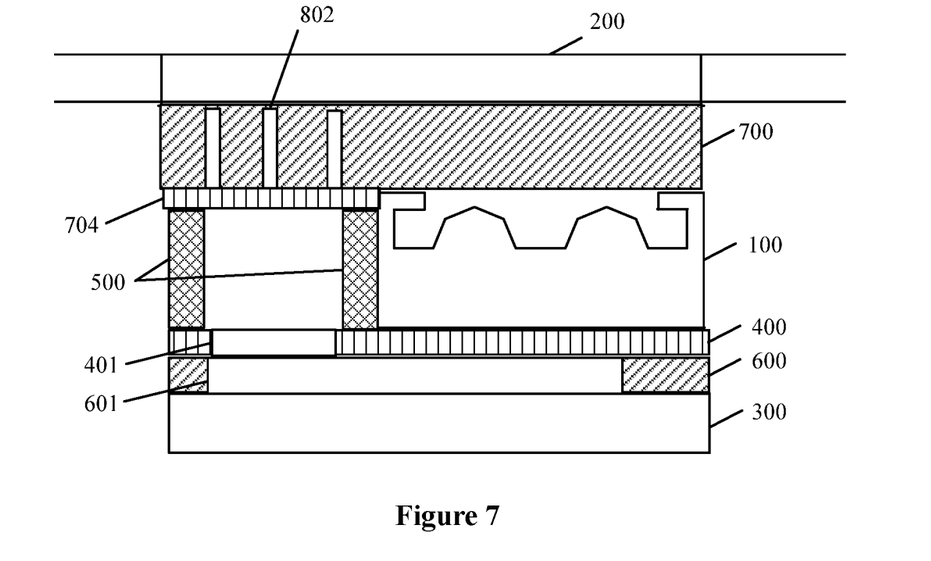
FIG. 7 is a schematic structural diagram of a mobile terminal disclosed in another embodiment of the disclosure.

As shown in FIG. 7, when the receiver is stacked with the sensor, for the sensor protective housing 700 over the sensor 100, a fourth through hole or a set of honeycomb holes for facilitating transmission of a sound is arranged in the sensor protective housing 700 at a position corresponding to the earphone sound conducting component 500. A dustproof net 704 is further arranged between the sensor protective housing 700 and the sensor 100 at a position corresponding to the fourth through hole or the set of honeycomb holes.

That is, the earphone decorative component 800 may be implemented by utilizing the sensor protective housing 700. The sensor protective housing 700 completely covers the earphone opening 200. The fourth through hole or the set of honeycomb holes is arranged in the sensor protective housing 700 to easily conduct the sound. In this case, in order to prevent a dust from entering, the dustproof net 704 is arranged on the side of the sensor 100 but not between the sensor protective housing 700 and the earphone opening 200, to prevent the dustproof net 704 from affecting the appearance effect.

Figure 8:
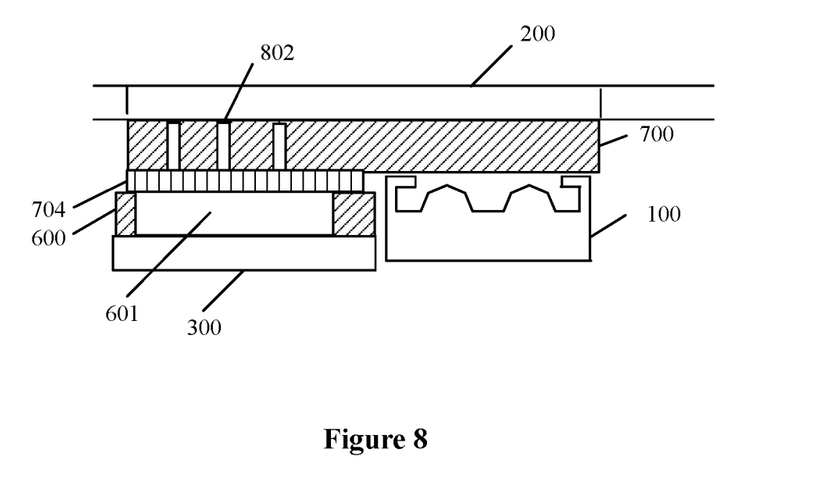
FIG. 8 is a schematic structural diagram of a mobile terminal disclosed in another embodiment of the disclosure.

As shown in FIG. 8, when the receiver 300 and the sensor 100 are arranged in parallel in a horizontal direction, for the sensor protective housing 700 over the sensor 100, a fourth through hole or a set of honeycomb holes for facilitating transmission of a sound is arranged in the sensor protective housing 700 at a position corresponding to the receiver 300. A dustproof net 704 is further arranged on the side of the sensor 100 at a position corresponding to the fourth through hole or the set of honeycomb holes.

Figure 9:
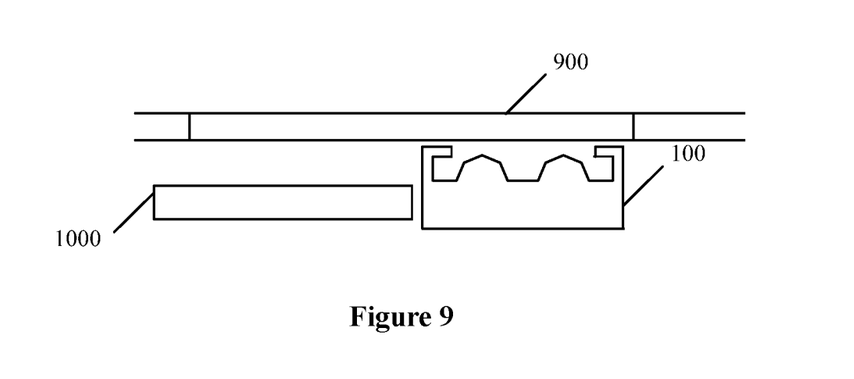
FIG. 9 is a schematic structural diagram of a mobile terminal disclosed in another embodiment of the disclosure.

The embodiment that the sensor is located in the earphone opening is specifically illustrated above. Hereinafter the embodiment is illustrated where the sensor is located in the microphone opening. As shown in FIG. 9, a mobile terminal is further provided according to the disclosure, which includes the sensor 100, and a microphone 900 arranged on the front panel of the mobile terminal device. The sensor 100 is arranged in a housing of the mobile terminal at a position corresponding to the microphone opening 900. The sensor 100 includes a sensor for sensing a light, a location or a distance.

The mobile terminal related to the embodiment includes an electronic device with a microphone opening such as a mobile phone or an ipad.

A microphone 1000 located in the opening, the microphone 1000 and the sensor 100 may be arranged side by side.

The disclosure further provides a mobile terminal, which includes a sensor, a microphone opening and an earphone opening, with the microphone opening and the earphone opening being arranged on a front panel of the mobile terminal device. The sensor is arranged in a housing of the mobile terminal at a position corresponding to the microphone opening and a position corresponding to the earphone opening. The sensor includes a sensor for sensing a light, a location or a distance. The mobile terminal related to the embodiment includes an electronic device with a microphone opening such as a mobile phone or an ipad.

Various embodiments of the specification are described in a progressive way, and each embodiment lays emphasis on differences from other embodiments. For the same or similar parts among various embodiments, one may refer to the description of other embodiments.

The above descriptions of the disclosed embodiments make those skilled in the art may implement or use the disclosure. Various amendments to the embodiments are obvious to those skilled in the art. General principles defined in the specification may be implemented in other embodiments without departing from the spirit or scope of the present disclosure. The present disclosure is not limited to the embodiments shown in the description, but is to conform to the widest scope in accordance with the principles and novel features disclosed herein.

The invention claimed is:

1. A mobile terminal, comprising:
   a sensor, wherein the sensor comprises a sensor for sensing a light, a location or a distance;
   an earphone opening arranged on a front panel of the mobile terminal, wherein the sensor is arranged in a housing of the mobile terminal at a position corresponding to the earphone opening; and
   a sensor protective housing over the sensor, wherein a bulge is arranged on the sensor protective housing at a position corresponding to the sensor, a groove is arranged in the sensor protective housing on a side of the bulge, and a second through hole is arranged in the groove.

2. The mobile terminal according to claim 1, wherein the sensor comprises any combination of a distance sensor, a light sensor and a photoelectric sensor.

3. The mobile terminal according to claim 1, further comprising a receiver,
   wherein the receiver is stacked with the sensor, and the sensor is arranged between the receiver and the earphone opening.

4. The mobile terminal according to claim 3, further comprising a supporting plate arranged between the sensor and the receiver,
   wherein the supporting plate extends beyond the sensor, and a first through hole is arranged in an extending portion of the supporting plate.

5. The mobile terminal according to claim 4, further comprising an earphone sound conducting component perpendicularly connected to the supporting plate and conforming to the sensor on one side of the first through hole.

6. The mobile terminal according to claim 3, further comprising a foam connected to the receiver and arranged between the receiver and the earphone opening.

7. The mobile terminal according to claim 1, further comprising a receiver,
wherein the sensor and the receiver are arranged in parallel in a horizontal direction.

8. The mobile terminal according to claim 1, further comprising a dustproof net arranged over the sensor protective housing and fitting with the groove.

9. The mobile terminal according to claim 8, further comprising an earphone decorative component connected to the sensor protective housing,
wherein a third through hole fitting with the bulge of the sensor protective housing is arranged in the earphone decorative component, and a fourth through hole or a set of honeycomb holes for facilitating transmission of a sound is arranged in the earphone decorative component at a position corresponding to the groove.

10. The mobile terminal according to claim 9, wherein the earphone decorative component comprises a metal material or a plastic material.

11. The mobile terminal according to claim 10, wherein the earphone decorative component is connected to the sensor protective housing by means of a double faced adhesive tape or a glue.

12. The mobile terminal according to claim 11, wherein in a case where the earphone decorative component is a metal material, the earphone decorative component is connected to the sensor protective housing by means of injection molding.

13. The mobile terminal according to claim 1, wherein the sensor protective housing is formed of an acrylic, a polycarbonate, a propylene-butadiene-phenyl diene polymer or glass.

14. A mobile terminal, comprising:
a sensor, wherein the sensor comprises a sensor for sensing a light, a location or a distance;
a microphone opening arranged on a front panel of the mobile terminal, wherein the sensor is arranged in a housing of the mobile terminal at a position corresponding to the microphone opening; and
a sensor protective housing over the sensor, wherein a bulge is arranged on the sensor protective housing at a position corresponding to the sensor, a groove is arranged in the sensor protective housing on a side of the bulge, and a second through hole is arranged in the groove.

15. The mobile terminal according to claim 14, further comprising a microphone, wherein the microphone and the sensor are arranged side by side.

16. A mobile terminal, comprising:
a sensor, wherein the sensor comprises a sensor for sensing a light, a location or a distance;
a microphone opening and an earphone opening which are arranged on a front panel of the mobile terminal, wherein the sensor is arranged in a housing of the mobile terminal at a position corresponding to the microphone opening and a position corresponding to the earphone opening; and
a sensor protective housing over the sensor, wherein a bulge is arranged on the sensor protective housing at a position corresponding to the sensor, a groove is arranged in the sensor protective housing on a side of the bulge, and a second through hole is arranged in the groove.

* * * * *